(No Model.)
W. J. TRIPP.
REVOLUBLE SECTIONAL JOURNAL BEARING.
No. 531,483. Patented Dec. 25, 1894.
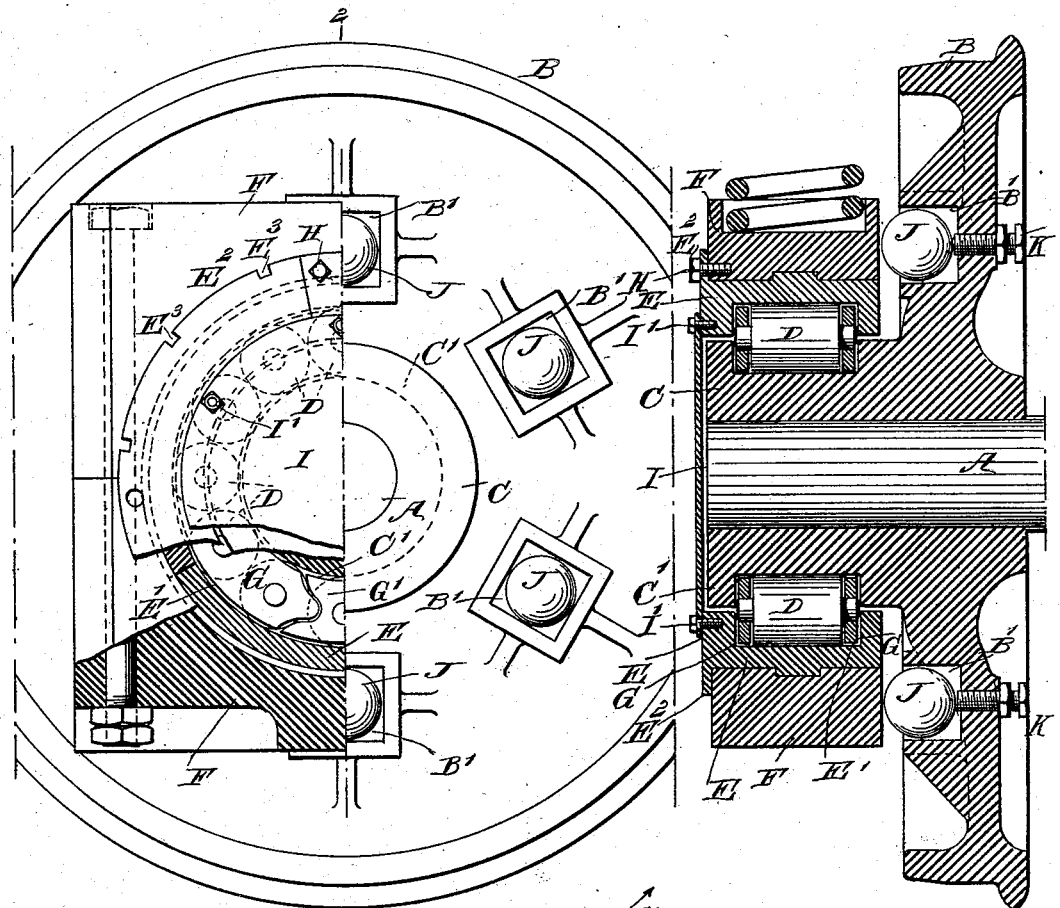
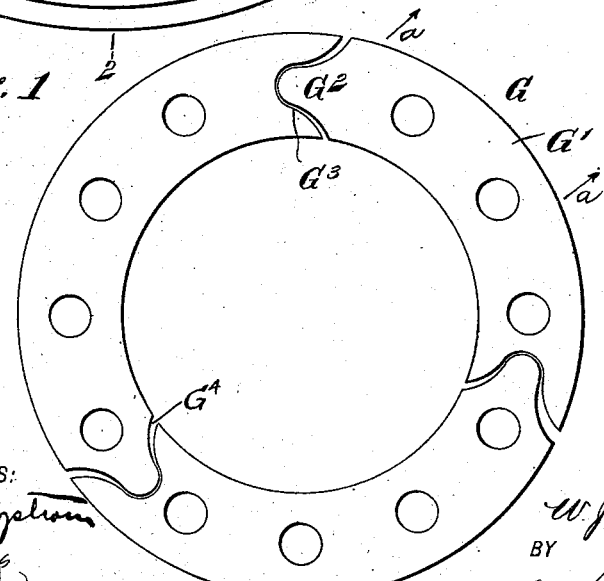
Fig. 1  Fig. 2  Fig. 3
WITNESSES:  INVENTOR
  W. J. Tripp
BY
  Munn & Co.
ATTORNEYS.

UNITED STATES PATENT OFFICE.

WILLIAM J. TRIPP, OF NEW YORK, N. Y.

REVOLUBLE SECTIONAL JOURNAL-BEARING.

SPECIFICATION forming part of Letters Patent No. 531,483, dated December 25, 1894.

Application filed March 8, 1894. Serial No. 502,865. (No model.)

*To all whom it may concern:*

Be it known that I, WILLIAM J. TRIPP, of the city, county, and State of New York, have invented a new and Improved Revoluble Sectional Journal-Bearing, of which the following is a full, clear, and exact description.

The invention relates to bearings such as shown and described in Letters Patent of the United States, No. 515,629, granted to me February 27, 1894.

The object of the invention is to provide a new and improved revoluble sectional journal bearing, more especially designed for use on railway car wheels and axles, and which is comparatively simple and durable in construction and arranged to reduce the friction of the working parts to a minimum and to take up lateral thrust of the wheel and axle.

The invention consists of certain parts and details, and combinations of the same, as will be hereinafter described and then pointed out in the claims.

Reference is to be had to the accompanying drawings, forming a part of this specification, in which similar letters of reference indicate corresponding parts in all the figures.

Figure 1 is a face view of the improvement with parts in section. Fig. 2 is a transverse section of the same on the line 2—2 of Fig. 1; and Fig. 3 is an enlarged face view of one of the rings carrying the rollers.

On each end of the axle A is shrunk a wheel B, provided with a hub C extending outwardly and formed in its peripheral surface with an annular recess $C'$, in which travel the friction rollers D also extending into an annular recess $E'$ formed in the brass or journal bearing E, made in two or more sections and mounted to turn in the journal box F, likewise made in two or more sections, as shown in Fig. 1, and fitted with its sides in the usual bearings or guideways attached to or forming part of the truck on which the car wheel is used.

The rollers D are formed with trunnions journaled in suitable bearings in the rings G, extending into the registering annular recesses $C'$ and $E'$ the rollers touching the peripheral surface thereof, and the rings being each made in sections $G'$, as plainly shown in Figs. 1 and 3, each section being formed at one end with a nose $G^2$ and its other end with a notch $G^3$ adapted to be engaged by the nose $G^2$ of the next adjacent section $G'$, as will be readily understood by reference to the said Fig. 3. The notches $G^3$ and noses $G^2$ have curved contacting surfaces, and are made of slightly different shapes, so as to leave a free space $G^4$ between the inner and outer portions of the adjacent ring sections and allow for a certain mobility of the ring sections relatively to each other, for a purpose to be stated presently.

It will be seen that the rings G have to be made in sections so as to permit of placing the rings in position in the annular recess $C'$ and the brass or journal bearing E is likewise to be made in sections so as to fit the sections onto the rings carrying the rollers D, as the said rings extend into both the registering recesses $C'$ and $E'$. When the upper sections of the bearing and of the brass are removed, it is easy to withdraw the upper sections of the rings G by pressing the ends of the adjacent sections downward so as to turn the said sections around their joints and increase the distance between their upper ends, when the upper sections may be slid out in an approximately radial direction, as indicated by the arrow $a$ in Fig. 3. The brass or journal bearing E is formed on its outer end with a flange $E^2$ extending onto the front face of the journal box F and the said flange is adapted to be fastened in place on the journal box by a bolt H, as plainly illustrated in Figs. 1 and 2.

In order to cover the joint between the hub C and the brass E, I provide a dust plate I preferably made in the shape of a disk and fastened by set screws or bolts $I'$ to the said brass E, as indicated in Figs. 1 and 2. In order to take up lateral thrust of the axle and wheel relative to the journal box, I provide the outer face of the wheel B with recesses or bearings $B'$, each adapted to receive a ball J, extending beyond the outer face of the wheel B to engage the inner face of the journal box F, so that the wheel on rotating will carry the balls J along, the latter traveling with their outer ends on the inner face of the said journal box F.

In order to adjust the balls J relative to the inner face of the journal box F, I provide the wheel B with bolts K or other suitable means for adjusting the said balls J transversely in their bearings B', so as to bring the outer ends of the balls in contact with the inner face of the journal box F.

It is understood that by the arrangement described, the frictional contact between the hub C of the wheel B and the bars E is taken up by the rollers D, so that the friction is reduced to a minimum and consequently the parts will last much longer, and it requires less power to move a car over the tracks, and at the same time a lateral or end thrust of the axle A and the wheel B is taken up by the balls J traveling on the inner face of the journal box F.

It will be seen that as the rollers D are journaled in the sectional rings G, the said rollers are held suitable distances apart, so that their peripheral surfaces do not rub one on the other, as is the case in the rollers described and shown in the patent above referred to.

The bearing or hub part C may be independent of the wheel A, and in this case a separate bearing part C is shrunk directly on the end of the axle B, or otherwise fastened to the same; it being understood that as large a bearing surface as possible is desirable to increase the number of rollers D.

Having thus fully described my invention, I claim as new and desire to secure by Letters Patent—

1. The combination, with the hub adapted to receive an axle, and having an annular recess in its outer peripheral surface, of a brass or journal box formed with an annular interior recess corresponding to that of the hub and registering therewith, rings interposed between the brass and the hub and projecting partly into the recess of the hub, and partly into that of the brass, and rollers journaled in the said rings and arranged within the said recesses, substantially as described.

2. A bearing ring for the purpose described, said ring consisting of sections provided at their adjacent ends with notches and noses respectively, said notches and noses being adapted to engage at their central portions, but being spaced at their inner and outer portions when the sections form a circular ring, so that each of the sections can be turned outward relatively to the adjacent sections, substantially as described.

3. A hub having an annular recess in its outer peripheral surface, a journal box surrounding the hub and having a corresponding annular interior recess, and roller-carrying rings interposed between the journal box and the hub and projecting partly into the recess of the hub, and partly into that of the journal box, said rings being composed of sections that are capable of a limited movement relatively to each other, whereby the rollers are rendered self-adjusting, substantially as described.

4. A car wheel provided with an annular exterior recess in its hub, a journal box inclosing the said hub and provided with an annular interior recess, rollers interposed between the said journal box and hub and located within the recesses thereof, the wheel also having in its web recesses arranged at a greater distance from the wheel center than the recesses in the hub and journal box, and balls located in the recesses of the web and adapted to bear against the journal box, substantially as described.

WILLIAM J. TRIPP.

Witnesses:
 THEO. G. HOSTER,
 JNO. M. RITTER.